United States Patent [19]
Jensen

[11] Patent Number: 5,873,193
[45] Date of Patent: Feb. 23, 1999

[54] TOTAL CONTROL REFILLABLE BAITING SYSTEM

[76] Inventor: Eric L. Jensen, 8041 Gardner Rd., Lot 4B, Tampa, Fla. 33625

[21] Appl. No.: 853,445

[22] Filed: May 9, 1997

[51] Int. Cl.⁶ ............................................. A01M 1/20
[52] U.S. Cl. ................................. 43/131; 43/132.1
[58] Field of Search ..................... 43/107, 124, 131, 43/132.1; 403/277, 282, 285, 220, 223, 242, 244, 263; 47/48.5; 52/102; 248/156

[56] References Cited

U.S. PATENT DOCUMENTS

| | | | |
|---|---|---|---|
| 1,729,389 | 9/1929 | Hughett | 43/131 |
| 1,734,818 | 11/1929 | March | 43/107 |
| 1,815,595 | 7/1931 | Simpson | 43/131 |
| 2,750,707 | 6/1956 | Ekstedt | 43/131 |
| 3,476,421 | 11/1969 | Torres . | |
| 4,793,093 | 12/1988 | Gentile | 43/131 |
| 5,357,709 | 10/1994 | Lin | 43/131 |
| 5,379,545 | 1/1995 | Gall et al. | 43/131 |
| 5,528,854 | 6/1996 | Antonali et al. | 43/131 |
| 5,548,922 | 8/1996 | Wefler | 43/131 |
| 5,644,888 | 7/1997 | Johnson | 52/651.01 |

*Primary Examiner*—Jack W. Lavinder
*Attorney, Agent, or Firm*—Patent & Tademark Services; Thomas Zack; Joseph H. McGlynn

[57] ABSTRACT

A reusable and refillable insect bait container having insect base passageways to its interior bait reservoir, a removable top cap, and a lower ground engaging support stake member. The ground engaging stake member has upper protrusions that engage base notches to hold these two components together. The cap has a lower mating indent which engages a protruding member on the base to hold these components together in a snap fit relationship. When access to the base's reservoir is desired, the removable cap is pulled off by a tab and the bait needed inserted. Both the base and cap should be made of a flexible weather resistant material, such as rubber or soft plastic, to permit the firmer stake material and its protrusions to easily be inserted in a locking manner into the base.

6 Claims, 2 Drawing Sheets

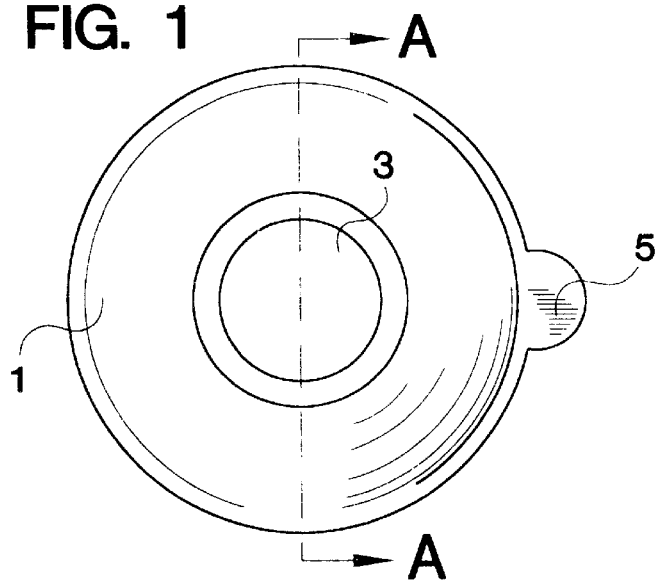
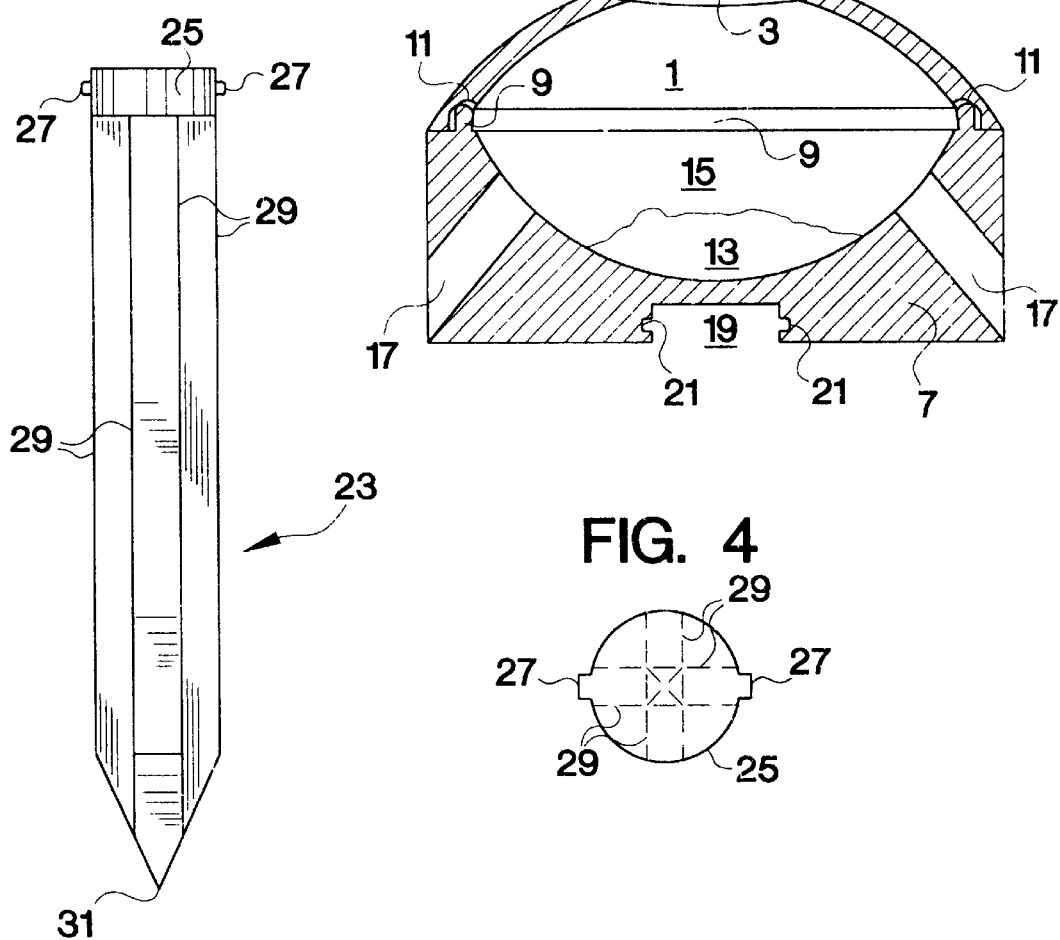
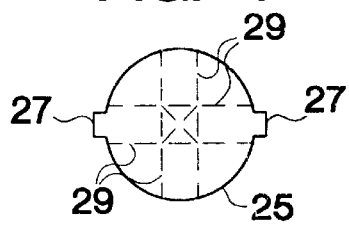

TOTAL CONTROL REFILLABLE BAITING SYSTEM

BACKGROUND OF THE INVENTION

The control of insects, especially those found in warmer climates such as fire ants and carpenter ant, has become an increasing larger problem as more and more people relocate to the sunbelt states. Various methods have been developed to combat this problem including the widespread use of insect sprays and the use of insect baited traps targeted to the specific insect groups to be controlled. Sprays by their very nature may expose pets, people and vegetation to their toxic effects and may also be harmful to the environment over time.

Around the home both types of insect control have been used. When insect traps are employed, there is usually an entrance for the insects to enter the trap where they are exposed to either a consumable or contacting bait and an exit for them to leave after their exposure. These traps may be located either within the person's home or adjacent to it at strategic outside locations where the insects have been seen. The present invention is concerned with a new type of reusable insect container that is designed to be used outdoors adjacent to a residence. When so used, the container's bait is kept safe from the elements thereby insuring the bait's continued potency and allowing the exposed insects to bring its destructive power back to the insects' nest, queen and eggs.

DESCRIPTION OF THE PRIOR ART

Baited insect traps and containers are known. For example, in U.S. Pat. No. 5,357,709 to Lin discloses a bait storage apparatus having a flat seat and a hollow covered cylinder centrally fixed to the seat. Notches in the cover are align able with holes in the cylinder to allow access to the cylinder's interior.

The Gall patent (U.S. Pat. No. 5,379,545) describes a device for diffusing a chemical animal repellent having a ground engaging pin, a sloping cover and orifices to permit diffusion.

In the patent to Antonali et al. (U.S. Pat. No. 5,528,854) a support body 12 driven into the soil, resembling a stake in outline, has its own upper bait holding cavity and a cover 18.

U.S. Pat. No. 5,548,922 to Wefler shows a liquid insect bait station which has a base with a cover over it and a spill-resistant access means. In contrast to this prior art and the known prior art, the present invention provides for a baited insect container having a removable cap and lower base with a reservoir usable outdoors. A ground engaging member has upper locking extensions used to mount it to a complementary shaped notch in the lower base. Access to refill the bait in the interior of the container is obtained by removing the cap from the base all as more further set forth in this specification.

SUMMARY OF THE INVENTION

This invention relates to a reusable and refillable insect bait container having insect base passageways, a removable cap, a lower bait base reservoir and a ground engaging support member. The ground engaging support member has upper extensions that engage base notches to hold the two container components together. The cap has a lower mating indent which engages a protruding member on the base to hold these components together.

It is the primary object of the present invention to provide for an improved outdoor insect bait container.

Another object is to provide for such a container having a ground engaging support locked into the container's base.

These and other objects and advantages of the present invention will become apparent to readers from a consideration of the ensuing description and the accompanying drawings.

BRIEF DESCRIPTION OF THE DRAWINGS

FIG. 1 is a top view of the invention's preferred embodiment.

FIG. 2 is a side cross sectional view of the FIG. 1 embodiment viewed in the direction of the arrows along line A—A of FIG. 1.

FIG. 3 shows a side view of the ground engaging member.

FIG. 4 is a top view of the FIG. 3 member.

DESCRIPTION OF THE PREFERRED EMBODIMENT

Figure 5:
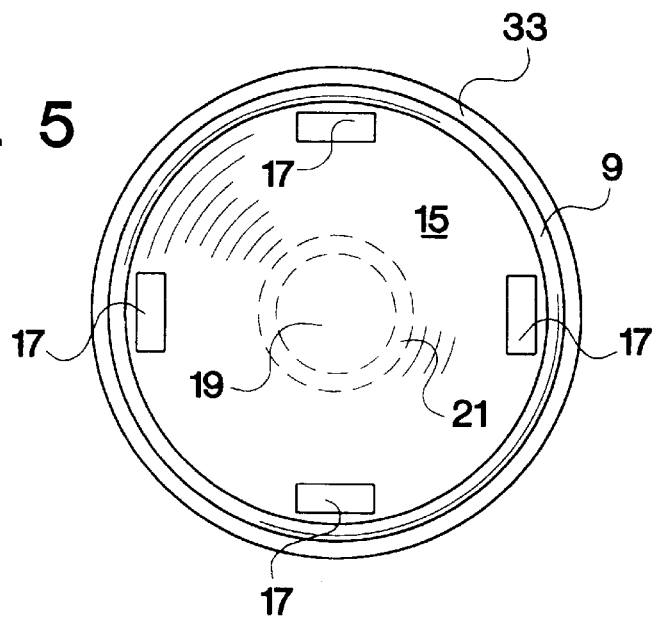
FIG. 5 depicts a top view of the base.

FIG. 1 is a top view of the invention's preferred embodiment. The container's domed shaped circular rubber cover or cap 1 has a centrally located brightly upper colored (e.g., yellow) dot 3. Located along the cap's periphery is an outwardly extending tab member 5 used to permit easy removal of the top from its lower base member. As best shown in the FIG. 2 side cross sectional view taken long line A—A of FIG. 1, the cap 1 is firmly mounted over the container's lower hard rubber base 7. Extending completely around the interfacing periphery between the cap and base is an upright ridge 9 which mates with a similar shaped indented 11 extending completely around engaging inner portion of the cap 1. This engagement between the rubber cap and its rubber base is a removable but firm snug snap-on type fit which insures complete protection from the elements, especially rain, for any insect bait 13 placed within the base's reservoir 15. Outside of the engaging ridge 9 and the indent 11 the mating surfaces of the cap and base lie flat against each other when cap is in a closed position over the base as shown.

Also depicted are two of the four inclined passageways 17 extending from the reservoir to the base's opposite side and outside the base to allow insects to both enter and exit from the interior reservoir 15 of the container.

At the base lower portion there is a center circular cut out 19 having smaller side notches formed in a circular pattern around the larger cut out 19. The purpose of these two interrelated base notches is to engage the top portion of the container's ground engaging support stake member 23 shown in a side view in FIG. 3. The upper top 25 of member 23 is circular when viewed from above as shown in FIG. 4. Extending outwardly from the circular portion 25 are two opposite protrusions 27 which are sized and shaped to engage the indentation 21 in the base's bottom portion. Since the material making up the base is rubber and flexible it will deform when pressed against the more rigid material, like a hard plastic or metal, making up the member 23 and its engaging protrusions 27. Thus, by first driving the stake member 23 into the soil the base and its cut out 19 can be positioned over the top 25 and pressed down until the stake protrusions 27 lock into the notches 21. The body portion of the stake member 23 is formed by four parallel elongated joined edges 29 which terminate in a lower pointed end 31.

The top view of the FIG. 3 member 23 is shown in FIG. 4. As shown in dotted line format in FIG. 4, the four edges 29 intersect in a cross pattern at right angles and extend outwardly about the same distance as the diameter of top 25 with the protrusions 27 being slightly further out.

FIG. 5 depicts a top view of the base 7 with the cap 1 removed looking down into its bait reservoir 15. Shown in dotted line format is the circular indentation 21 and its concentric central cut out base portion 19, The four insect exits/entrances for passageway 17 intersecting the upper part of the reservoir as also depicted. The base's circular raised ridge 9 and its flat outer edge surface 33 are also visible.

Figure 6:
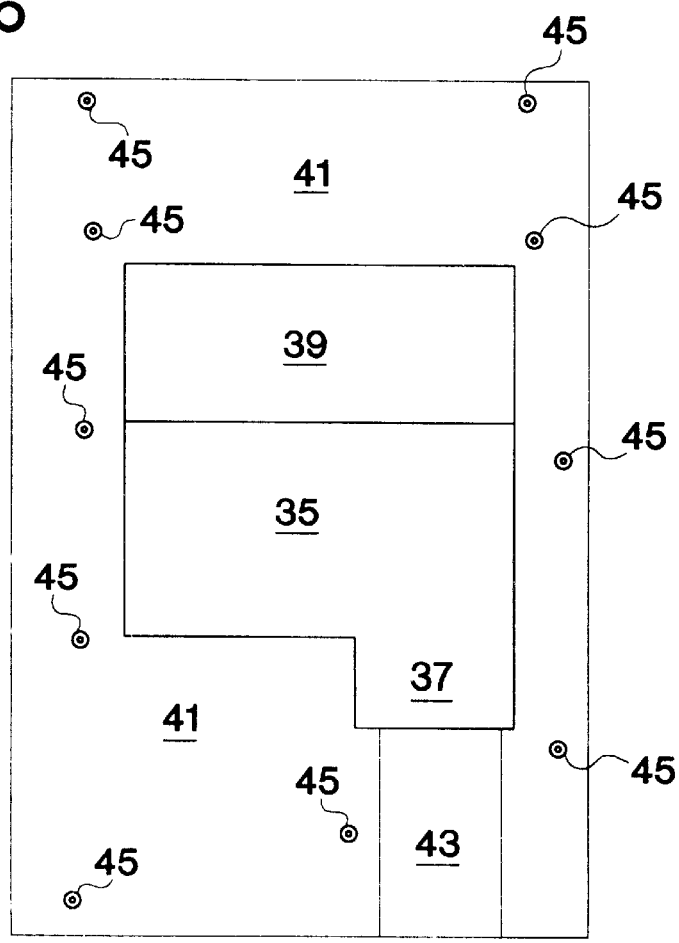
FIG. 6 shows a top view of the suggested placement of several insect bait containers around a typical house.

FIG. 6 shows a top view of the suggested placement of several insect bait containers around a typical house 35 having an attached front garage 37 and a rear attached lanai 39 or Florida room. Outside yard area 41 surrounds the house and its attachments on all sides and may have a driveway 43 joining the garage. The containers assemblies 45 made up of the cap 1, its lower base 7 and the ground engaging stake member 23 are strategically positioned at spaced locations around the house and firmly fixed to the ground by their stakes. Their exposed bright colored dome shaped central dome 3 allows them to be easily seen while their low silhouette structure permits a person's foot to easily walk over them or a lawn mover to ride over them without interference.

Once the bait is taken by the insects it can easily be replaced by pulling up on tab 5 to remove the cap 1 and allow access to the container's interior reservoir 15. It should take sufficient force to remove this cap such that a young child may not accidentally gain access to the container. The bait 13 itself can be any conventional insect bait whether in a powder, pellet or liquid form. Besides using rubber to construct the cap and base, many plastic materials having a degree of flexibility could also be used such as ABS (Acrylonitrile-butadiene-styrene) plastic material. The well known plastic injection molding process is well suited to manufacturing such component products.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A reusable and refillable insect bait container comprising:
    a base support having a top edge, a bait reservoir and insect passageways, said base support made of a flexible material having a lower cutout section with an indentation being sized and shaped to engage and receive a rigid ground engaging support member;
    a removable cap for said base support, said cap having a lower edge surface that engages the top edge of the base support; and,
    a rigid ground engaging support member having an upper portion partially insertable into said cutout and said indentation to hold said base support thereon, said support member having at least two upper extending rigid protrusions that engage in and are retained in the indentation wherein said base support is deformed when said upper portion of the rigid ground engaging support member is pressed into the cutout section to allow said upper extending rigid protrusions to engage the indentation and be retained therein by said indentation in a snap fit manner.

2. The apparatus as claimed in claim 1, wherein said cap is dome shaped with a lower peripheral indentation edge extending completely around its perimeter.

3. The apparatus as claimed in claim 2, wherein said base has an upright ridge edge extending around its perimeter that engages the lower perimeter indentation on the cap to join the two elements together.

4. The apparatus as claimed in claim 1, wherein said base's lower cut out section indentation is circular and extends around it.

5. The apparatus as claimed in claim 4, wherein said cap and base are made of a flexible weather resistant material.

6. The apparatus as claimed in claim 1, wherein said cap is made of a deformable material and engages the top edge of the base in a snap fit manner.

* * * * *